US011652961B2

(12) United States Patent
Ratnakaram et al.

(10) Patent No.: US 11,652,961 B2
(45) Date of Patent: *May 16, 2023

(54) APPARATUS AND METHODS FOR REMOTE VIEW OF SAFE DEPOSIT BOX CONTENTS

(71) Applicant: Bank of America Corporation, Charlotte, NC (US)

(72) Inventors: Udaya Kumar Raju Ratnakaram, Telangana (IN); Mohammed Zubair Mohammed Ajmal, Chennai (IN); Amit Mishra, Chennai (IN); Krithika Viswanathan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,503

(22) Filed: Jun. 2, 2022

(65) Prior Publication Data
US 2022/0295018 A1 Sep. 15, 2022

Related U.S. Application Data

(63) Continuation of application No. 17/140,002, filed on Jan. 1, 2021, now Pat. No. 11,381,783.

(51) Int. Cl.
H04N 7/18 (2006.01)
G01G 19/52 (2006.01)
G01G 23/37 (2006.01)
G06T 7/00 (2017.01)
G07C 9/00 (2020.01)
H04L 9/40 (2022.01)
H04N 5/262 (2006.01)
H04N 5/76 (2006.01)
H04N 7/04 (2006.01)
H04N 23/56 (2023.01)
H04N 23/661 (2023.01)
H04Q 9/00 (2006.01)
(Continued)

(52) U.S. Cl.
CPC ............ *H04N 7/183* (2013.01); *G01G 19/52* (2013.01); *G01G 23/3707* (2013.01); *G06T 7/97* (2017.01); *G07C 9/00912* (2013.01); *H04L 63/083* (2013.01); *H04N 5/2624* (2013.01); *H04N 5/76* (2013.01); *H04N 7/04* (2013.01); *H04N 23/56* (2023.01); *H04N 23/661* (2023.01); *H04Q 9/00* (2013.01); *G06T 2207/30232* (2013.01); *H04Q 2209/40* (2013.01)

(58) Field of Classification Search
None
See application file for complete search history.

(56) References Cited

U.S. PATENT DOCUMENTS 8,810,816 B2 8/2014 Fischer et al.
9,141,876 B1 9/2015 Jones et al.
(Continued)

*Primary Examiner* — Hung Q Dang
(74) *Attorney, Agent, or Firm* — Weiss & Arons LLP

(57) ABSTRACT

Apparatus and methods for remotely viewing and authenticating/validating the contents of a safe deposit box (or safe) are provided. The apparatus and methods may include a safe deposit box including a locking internal cavity, a camera, a weight sensor, a light, a control circuit, and a communication circuit. After receiving a request to view the contents and authenticating a user, the safe deposit box may take still or motion pictures of the contents and weigh the contents and send the results to the user or a server. If the contents of the safe deposit box have changed an alert may be sent to the user or a server.

7 Claims, 6 Drawing Sheets

(51) Int. Cl.
    *G01G 19/42*     (2006.01)
    *H04N 5/77*     (2006.01)

(56) References Cited

U.S. PATENT DOCUMENTS

| | | |
|---|---|---|
| 9,230,380 B2 | 1/2016 | Marsden |
| 9,286,455 B2 | 3/2016 | Senthurpandi |
| 9,558,418 B2 | 1/2017 | Jones et al. |
| 10,580,068 B2 | 3/2020 | Jacobson |
| 2009/0298546 A1 | 12/2009 | Kim et al. |
| 2011/0199183 A1 | 8/2011 | Marsden |
| 2012/0268762 A1 | 10/2012 | Fischer et al. |
| 2014/0101453 A1 | 4/2014 | Senthurpandi |
| 2015/0356366 A1 | 12/2015 | Jones et al. |
| 2016/0197919 A1 | 7/2016 | Senthurpandi |
| 2016/0212389 A1 | 7/2016 | Mehrotra et al. |
| 2016/0219046 A1 | 7/2016 | Ballard et al. |
| 2016/0374494 A1 | 12/2016 | Geng |
| 2017/0098134 A1 | 4/2017 | Jones et al. |
| 2017/0286905 A1 | 10/2017 | Richardson et al. |
| 2020/0250746 A1 | 8/2020 | Jacobson |

APPARATUS AND METHODS FOR REMOTE VIEW OF SAFE DEPOSIT BOX CONTENTS

CROSS REFERENCE TO RELATED APPLICATION

This application is a continuation of U.S. patent application Ser. No. 17/140,002, filed on Jan. 1, 2021 and entitled "APPARATUS AND METHODS FOR REMOTE VIEW OF SAFE DEPOSIT BOX CONTENTS," which is hereby incorporated by reference herein in its entirety.

FIELD OF TECHNOLOGY

This disclosure relates to apparatus and methods for remotely viewing and authenticating the contents of a safe deposit box or safe.

BACKGROUND

Currently, owners of safe deposit boxes (and safes) must physically open their safe deposit boxes (or safes) to check on or take an inventory of the contents. This practice may be unhygienic and takes time. In addition, the owners may be limited to certain times as to when they can check the contents, as safe deposit boxes may only be accessible during limited banking hours.

In addition, relying on physical inspection of the contents may slow down response times if something is stolen or missing from the safe deposit boxes (or safes).

Therefore, it is desirable to provide apparatus and methods for safely, securely, and remotely viewing and checking/validating the contents of a safe deposit box.

SUMMARY OF THE DISCLOSURE

It is an object of this disclosure to provide apparatus and methods for remotely viewing and authenticating the contents of a safe deposit box or safe.

Any reference herein to a safe deposit box includes a safe, and any reference to a safe includes a safe deposit box. A safe deposit box may also be referred to as a safety deposit box.

A safe deposit box is provided. The safe deposit box may include a housing. The housing may include an internal cavity to hold contents, including valuables. The housing may be able to be locked.

The safe deposit box may include one or more cameras located in the housing configured to view and photograph the contents of the internal cavity. The safe deposit box may also include one or more lights positioned in the internal cavity to provide illumination for the camera(s). Alternatively, the camera(s) may be equipped with a flash. The safe deposit box may also include one or more weight sensors designed to weigh the contents of the internal cavity. The housing may include a microprocessor, non-transitory memory, a communication circuit, and a power supply. The microprocessor, non-transitory memory, communication circuit, camera(s), and light(s) may be powered by the power supply and electronically coupled to the microprocessor and each other.

In an embodiment, the non-transitory memory may be configured to store one or more photographs of the interior of the safe deposit box, store one or more weights of the contents of the safe deposit box, as well as store an operating system. The photograph(s) and weight(s) may each preferably be associated with a time stamp.

In an embodiment, the communication circuit may be configured to receive instructions from a server, as well as transmit information, including measured weight(s) and photograph(s) from the safe deposit box to that server or a different server. The instructions may include directions to take one or more photographs associated with a time stamp, turn on the light source, as well as take one or more weight sensor readings associated with a time stamp.

In an embodiment, the camera(s) may be configured to take still and motion pictures associated with a time stamp, i.e. videos, of the contents of the safe deposit box. In an embodiment, the camera may be equipped with an actuator to take a survey video or pan video of the internal cavity.

In an embodiment, the non-transitory memory includes random access memory ("RAM") and read only memory ("ROM").

In an embodiment, the power supply may be a battery. The power supply may be external (e.g., a standard power cord and plug), and may provide AC or DC current. In an embodiment, the power supply may be replaceable or rechargeable.

In an embodiment, the safe deposit box may include an exterior access panel configured to allow replacement or repair of the microprocessor, the weight sensors, the non-transitory memory, the communication circuit, and the power supply. The light source(s) and camera(s) may be repaired or replaced either through an exterior access panel or from the internal cavity of the safe deposit box.

In an embodiment, the communication circuit may include a network interface card ("NIC"), a Bluetooth antenna, a cellular antenna, or a wi-fi antenna.

In an embodiment, the safe deposit box may include an encryption controller. The encryption controller may allow for accurately authenticating the user/owner, as well as protecting the user/owner and financial institutions from users with malicious intent and/or fraud. In an embodiment, the non-transitory memory may include executable instructions and at least one datum configured to authenticate the user. These instructions and data may work in concert with, or separate from, any encryption controller.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
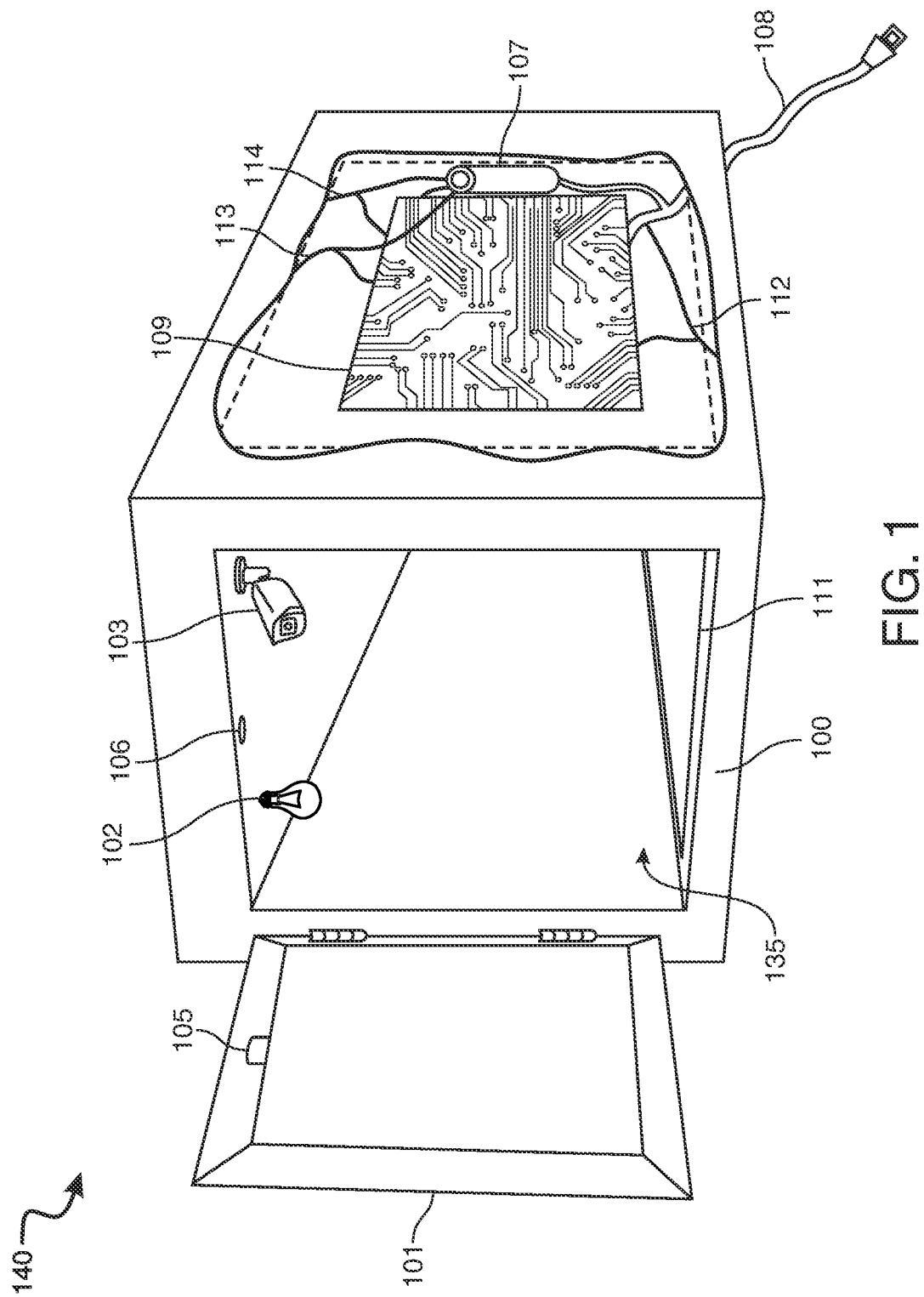
FIG. 1 shows an illustrative apparatus in accordance with the principles of the disclosure.

Apparatus and methods for remotely viewing and validating the contents of a safe deposit box or safe are provided.

The safe deposit box may include a housing with three or more walls, a door, a ceiling, and a floor arranged in a substantially cuboid shape. The components of the housing preferably form an internal cavity. Other shapes, such as spherical, prismatic, cylindrical, or pyramidical are possible in alternative embodiments. The internal cavity may be configured to lock. The safe deposit box may include at least one camera configured to photograph or video a substantial portion of the internal cavity. The camera may be located on the inside of the door, any of the walls, the ceiling or the floor. The camera may also be located in any corner of the internal cavity.

In alternative embodiments, the camera may work in the infrared or visible light spectrums. The camera may have a 'night-vision' mode. The camera may have a flash. The camera may be coupled to an actuator allowing the camera to pan in multiple directions. The camera may be coupled to a microprocessor located within the housing and may be able to send photographs or videos over the internet via a communication circuit. Any photographs or videos taken by the camera may be stored in non-transitory memory located within the housing or streamed to an external device.

The safe deposit box may also include one or more internal lights that may be triggered to turn on and illuminate any contents of the internal cavity. The internal light(s) may be turned on when the camera is activated.

The safe deposit box may also include one or more weight sensors located on or below the floor of the box. The weight sensor(s) may be coupled to a microprocessor and may be able to send data through the microprocessor over the internet or to a server. Any weight readings taken by the weight sensor(s) may be stored in non-transitory memory or streamed to an external device.

In some embodiments the safe deposit box may include a circuit located within the housing comprising a microprocessor, a power supply, a network interface component ("NIC" or "communication circuit"), and an input/output module. The power supply may be a battery. The NIC may enable connection to a media server (or the Internet directly) through, e.g., Bluetooth, wired LAN, a wireless network, a cellular network, any other suitable communication method, or a combination thereof. In an embodiment, the connection may be routed through a secure server.

In an embodiment, the safe deposit box may include one or more communication circuits. The communication circuit(s) may be configured to receive instructions and transmit images (still or video) and weight readings. The communication circuit(s) may communicate with an authentication server, a centralized server, a media server, or the Internet directly, or a combination thereof.

The communication circuit may be Bluetooth, wired LAN, a wireless network, a cellular network, NFC (near field communication), any other suitable communication method, or a combination thereof. The communication circuit may also be configured to receive communications. The received communications may be instructions to the weight sensor(s), camera, lights, microprocessor, or a combination thereof. The instructions may include: turn on, turn off, take photographs or video, measure the weight, and send the photographs, videos, and weights to non-transitory memory. The received communications may also include authentication information and may include any other suitable communication.

In an embodiment, the camera, the light, and the weight sensor(s) may be coupled to the microprocessor via an input/output module or other connection. In addition, the camera, light, and weight sensor(s) may be coupled to the power supply.

The power supply may be coupled to an external source of AC or DC voltage, such as a typical power cord and connection. The power supply may be an internal or external battery, or multiple batteries. The safe deposit box may have an accessible opening configured to allow access to the power supply, microprocessor, communication circuit, camera, light source, non-transitory memory, and any wires for repairs. The accessible opening may allow access to the battery or batteries for replacement. The battery or batteries may be rechargeable. In an embodiment, the accessible opening may not provide access to the internal contents of the safe deposit box.

In an embodiment, the safe deposit box may include an encryption controller. The encryption controller may allow for accurately authenticating the user/owner, as well as protecting the user/owner and financial institutions from users with malicious intent. In an embodiment, the non-transitory memory may include executable instructions and at least one datum configured to authenticate the user. These instructions and data may work in concert with, or separate from, any encryption controller.

Methods for safely and securely remotely viewing the contents of a safe deposit box are provided.

In an embodiment, a safe deposit box may comprise a box, a camera, a light, at least one weight sensor, and a communication circuit.

The communication circuit may be configured to communicate with an authentication server, a centralized server, a media server, or the Internet directly, or a combination thereof.

The customer may safely and securely view the contents of the safe deposit box remotely. The customer may send a request to view the contents to a centralized server. The request may be sent via one or more input channels. Possible input channels include, inter alia, a mobile phone browser, a mobile phone app, an internet browser, interactive voice response, an ATM ("automated teller machine"), or other appropriate channels.

The centralized server may then initiate an authentication process. In order to view the contents of the safe deposit box, the customer must satisfactorily complete the authentication procedure. The authentication procedure may include sending a one-time password ("OTP") to the customer's mobile phone or the customer's email address. The OTP may be sent via a text-message, an email, or through a voice call. The voice call may be automated. In order to satisfactorily complete the authentication procedure, the customer must enter the provided OTP when and where prompted by the centralized and authentication servers.

In an embodiment, the centralized server, in response to receiving the view request, may send an authentication request to an authentication server. The authentication request may initiate an authentication process.

In an embodiment, the authentication server may generate an OTP and then send the OTP to a mobile device associated with the user or input channel. The authentication server may then inform the centralized server of the OTP. In order to complete the authentication process, the customer must enter the provided OTP when and where prompted by the centralized server, including through the input channel, thereby validating the view request.

In an embodiment, the authentication server is part of the centralized server. In another embodiment, the authentication server is separate from the centralized server.

Once the view request has been authenticated and validated, the centralized server may send a request to turn on the camera(s) and/or weight sensor(s) to the safe deposit box. The request may also include a request to turn on one or more features of the camera (such as a night vision mode). The centralized server may also send a request to turn on one or more lights inside the safe deposit box.

In an embodiment, the centralized server may communicate directly with a media server, said media server then communicating with the safe deposit box. In another embodiment, the media server may be a part of the centralized server.

In another embodiment, the centralized server may communicate directly with the safe deposit box.

In an embodiment, after receiving the request, the media server may process the request and send the appropriate signals to turn one or more of the camera(s), weight sensor(s), and light(s) on and off and store and communicate the results. In an embodiment the safe deposit box may send the still or motion pictures and weight readings to the media server. The media server may then send the still or motion pictures and weight readings to the centralized server. Using the media server may increase security.

In an embodiment, after the media server transmits the still or motion pictures or weight reading(s) to the centralized server, it may direct the camera(s), weight sensor(s), and light(s) to turn off. The media server may also instruct the microprocessor to delete the still or motion pictures and weight readings from memory.

In an embodiment, after receipt of the still or motion pictures and weight readings, the centralized server may utilize a cross-channel functioning module to determine an appropriate output channel for the still or motion pictures and/or weight readings. Appropriate output channels may include, inter alia, a mobile phone browser, a mobile phone app, an internet browser, or an ATM. The output channel does not have to match the input channel, although it could in some situations. Once the output channel(s) is chosen and the data sent, the still or motion pictures may be displayed for the customer to remotely view the contents of the safe deposit box.

The cross-channel functioning module may choose an appropriate output channel by analyzing, inter alia, the location of the customer, the activity of the customer, past activity of the customer, customer choice, or any other appropriate data. The cross-channel functioning module may learn customer preference or modify its results through machine learning.

After viewing the still or motion picture(s) and/or weight readings, the customer may terminate the connection. Upon termination, or at some other point (such as after a predetermined amount of time has elapsed), the centralized server may send instructions to the safe deposit box to turn off the light and camera. In an embodiment, these instructions may be routed through the media server.

The customer may authorize the centralized or media servers to keep the still or motion picture(s) in data storage. Otherwise, the centralized and/or media servers may delete the still or motion picture(s).

Methods to authenticate the contents of a safe deposit box and recognize content changes are provided.

In an embodiment, a safe deposit box may comprise a box, a camera, a light, at least one weight sensor, and a communication circuit.

The communication circuit may be configured to communicate with an authentication server, a centralized server, a database, a media server, or the Internet directly, or a combination thereof.

After the customer places items in the safe deposit box, the media server or centralized server may direct the camera to take a still picture and may direct the weight sensor(s) to determine the weight of the contents. The weight sensor(s) may also generate a weight matrix of the weight in different areas of the safe deposit box. This direction may come from the customer, the financial institution, or be part of an automated process.

The picture(s) and weight reading(s), also referred to as first readings (e.g. first digital image and first weight), may then be sent to the media server and/or centralized server, or from the media server to the centralized server. The picture(s) and weight reading(s) may be converted to unique hash values by the media server or centralized server. The picture(s) and weight reading(s), along with the calculated hash values, may be stored on the media server, the centralized server, a separate database, or another appropriate location. The picture(s) and weight reading(s) may be time-stamped for future reference.

In an embodiment, these first readings and their hash value(s) may constitute initial or baseline readings and hash values for later comparison. These first readings may be authorized directly by the customer or as a security protocol by the financial institution.

The first readings may be replaced with later readings when authorized by the customer or the financial institution. The later readings will then constitute new baseline readings.

In an embodiment, only the customer may trigger the first readings and subsequent readings, along with any comparison between the first readings and subsequent readings, or comparison between subsequent readings.

In another embodiment, the media server or centralized server may authorize subsequent readings at pre-determined intervals, e.g. daily, every hour, monthly, weekly, or at other intervals determined by the customer or financial institution. Automatic readings (i.e., readings not at the request of the customer) may be referred to as "robotic vision readings".

In an embodiment, every subsequent reading, whether automatic or requested, may be compared to the baseline reading(s) by a centralized server. The image(s) and weight reading(s) may be compared directly, and the hash values of the subsequent readings may be compared to the baseline readings' hash values. The centralized server may generate a list of the comparisons. The list of comparisons may be transmitted to the customer.

In an embodiment, if significant changes are detected, an alert to the customer may be generated. A significant change may be on the order of a 1-5% (one-to-five percent) change in the weight or hash values. The centralized server may determine if a change is significant if it exceeds a pre-determined threshold value. In an embodiment, this pre-determined threshold value may be changed by the customer or financial institution. Minor fluctuations in the hash values may be expected due to dust or other environmental effects.

In an embodiment, the media server or centralized server may further comprise an image comparison algorithm and a weight comparison algorithm. The image comparison algorithm may identify any differences between a current image and a previously stored image. It may also identify any differences in hash values of the current image and the baseline image. The image comparison algorithm may utilize robotic vision algorithms or any other appropriate algorithm to perform the comparison(s).

The weight comparison algorithm may identify any differences between the current weight or weight matrix and a previously stored weight or weight matrix. It may also identify any differences in hash values of the current weight or weight matrix and the baseline weight or weight matrix.

In an embodiment, the media server or centralized server may send all readings to the customer, in list format or other appropriate format. For example, the media server or centralized server may send a first digital image and a second digital image, and/or a first weight and a second weight to the customer. In another embodiment, the media server or centralized server may send only a list of the comparisons made between a first digital image and second digital image, or a first weight and a second weight. In another embodiment, the media server or centralized server may send readings to the customer only if the media server or centralized server has detected a significant change.

In an embodiment, the media server or centralized server may combine the first digital image and second digital image into a combined image. The first digital image and second digital image may be located side-by-side or top-and-bottom, and each may comprise approximately one-half of the combined image. The media server or centralized server may then send the combined image to the user so the user may compare the images. Alternatively, the first digital image and second digital image may be superimposed over each other, highlighting any difference(s).

In an embodiment, the customer may request a reading to check on or authenticate/validate the contents of the safe deposit box at any time, through a mobile phone application, a website portal, interactive voice request, or any other appropriate input channel. The customer's request may be authenticated by the media server or centralized server. Authentication may be achieved through an OTP, two-factor authentication, or any other appropriate method.

The results, either the actual readings or if a difference was detected, may be sent to the customer through any appropriate output channel, including inter alia, a mobile phone application, a website, verbal confirmation, text message, postal mail, or any other appropriate output channel. In an embodiment, the results may only be viewed if the customer is authenticated.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative apparatus of safe deposit box 140 that may be configured in accordance with the principles of the disclosure. In an embodiment, the safe deposit box 140 may include one or more light sources 102, one or more cameras 103, and one or more weight sensors 111. The safe deposit box 140 may be of any suitable shape, and a cuboid shape may be preferable.

The safe deposit box 140 may include a housing 100 that forms an internal cavity 135. The internal cavity 135 may be sealed and locked via door 101 and locking bolt 105. Locking bolt 105 may secure the safe deposit box 140 through insertion into lock receptacle 106.

The safe deposit box 140 may include a control circuit board 109. The control circuit board may include a microprocessor (not shown), non-transitory memory (not shown), an input/output module (not shown), and a NIC/communication circuit (not shown). These components may be powered by a power supply 107. The power supply 107 may be a battery. The power supply 107 may be connected to external power through cable 108. Cable 108 may also include a network connection component, such as a CAT5 LAN cable.

Circuit board 109 and power supply 107 may be electronically coupled to light source 102 through wires 113. Camera 103 may be electronically coupled to the circuit board 109 and power supply 107 through wires 114. Weight sensor 111 may be electronically coupled to the circuit board 109 and power supply 107 through wires 112.

Circuit board 109 and its components, power supply 107, and wires 112, 113, and 114 may be accessed for repair and/or replacement through an access panel (not shown).

Figure 2:
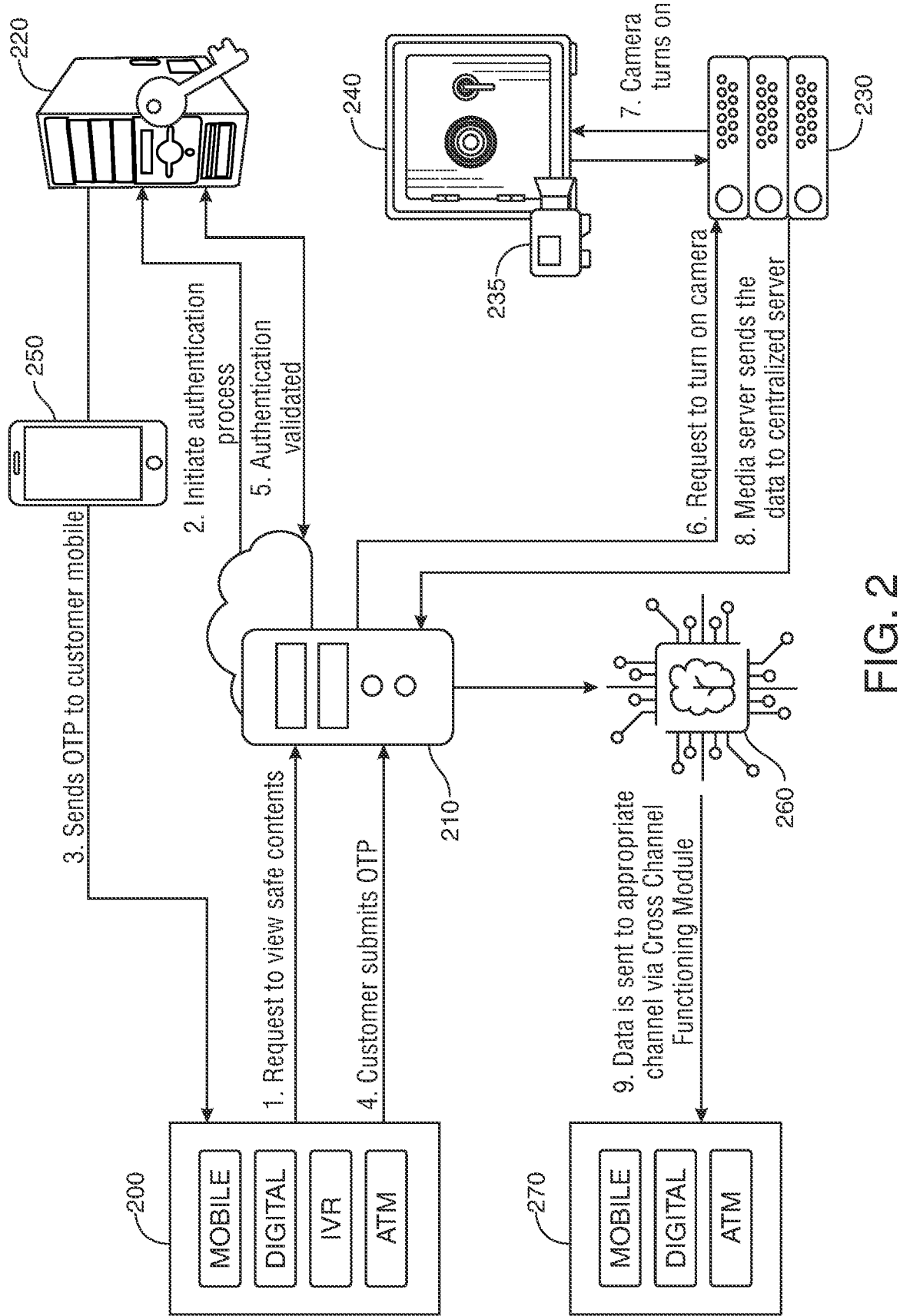
FIG. 2 shows an illustrative process schematic in accordance with the principles of the disclosure.

FIG. 2 shows an illustrative process schematic of a method to view the contents of a safe deposit box, in accordance with the principles of the disclosure. FIG. 2 contains both illustrative steps numbered 1 through 9 and numbered components 200 through 270.

In step 1, a customer or user sends a request to view a safe deposit box 240's contents from an input channel 200 to a centralized server 210. Input channel 200 may include, inter alia, a mobile phone browser, a mobile phone app, an internet browser, interactive voice response, an ATM ("automated teller machine"), or other appropriate channels. Centralized server 210 may have one or more cloud components.

In step 2, the centralized server 210 may initiate an authentication process by sending an authentication request to an authentication server 220. The authentication server 220 may be a part of the centralized server 210 or may be an entirely separate server. In step 3, the authentication server 220 may send an OTP to the customer's mobile phone 250. In alternative embodiments, the OTP may be sent via a text-message, an email, through a portion of a mobile application, or through a voice call.

In step 4, the customer may submit the OTP to the centralized server 210, and the OTP may be validated in step 5. If the request is authenticated and validated, in step 6, the centralized server 210 may transmit a request to a media server 230 to turn on one or more cameras 235, one or more lights, and/or one or more weight sensors inside safe deposit box 240. In step 7, the light(s), camera(s) 235, and/or weight sensor(s) are turned on and send data (still or motion digital images, weight(s)) to the media server 230.

In step 8, the media server 230 may send the data (still or motion digital images, weight(s)) to the centralized server 210. In step 9, through a cross-channel functioning module 260, the centralized server 210 may send the data to an appropriate output channel 270. Appropriate output channels may include, inter alia, a mobile phone browser, a mobile phone app, an internet browser, or an ATM. The output channel 270 does not have to match the input channel 200, although it could in some situations. Once the output channel(s) 270 is chosen and the data sent, the data may be displayed to remotely view the contents of the safe deposit box.

Figure 3:
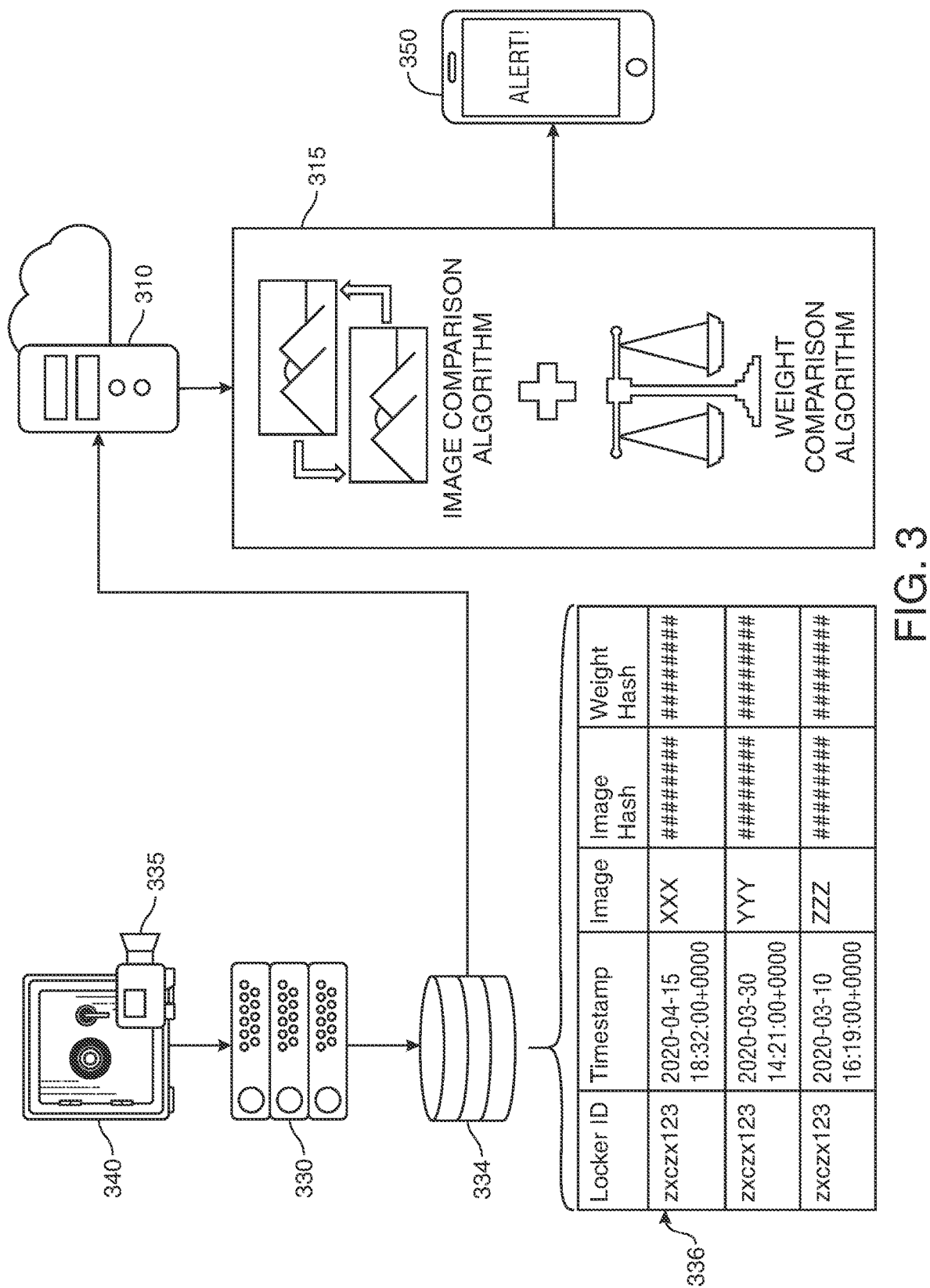
FIG. 3 shows an illustrative process schematic in accordance with the principles of the disclosure.

FIG. 3 shows an illustrative process schematic of a method to validate the contents of a safe deposit box, in accordance with the principles of the disclosure. FIG. 3 contains both illustrative steps and numbered components 310 through 350.

First, camera 335 in safe deposit box 340 may take a photograph or video of the contents. In addition, a weight or weight matrix may also be recorded. The data (still or motion digital images, weight(s)) may be sent to media server 330. Next, the media server 330 may create hash values for any image or weight and send the data (still or motion digital images, weight(s), and hash values) to a database 334. The database 334 may be a part of a centralized server 310 or separate. The database 334 may contain previous data entries 336.

Next, the data (still or motion digital images, weight(s), and hash values) may be sent to a centralized server 310. The centralized server 310 may perform comparisons 315 between any new data and prior data. For example, the centralized server 310 may use an algorithm to compare images, an algorithm to compare weights or weight matrices, and an algorithm to compare hash values. If the centralized server 310 detects a significant change/change exceeding a pre-determined threshold value (e.g. a difference of 5% or more between the hash values), it may inform the customer by sending a text message (or other type, e.g. an email or phone call) alert to the customer's mobile phone 350.

Figure 4:
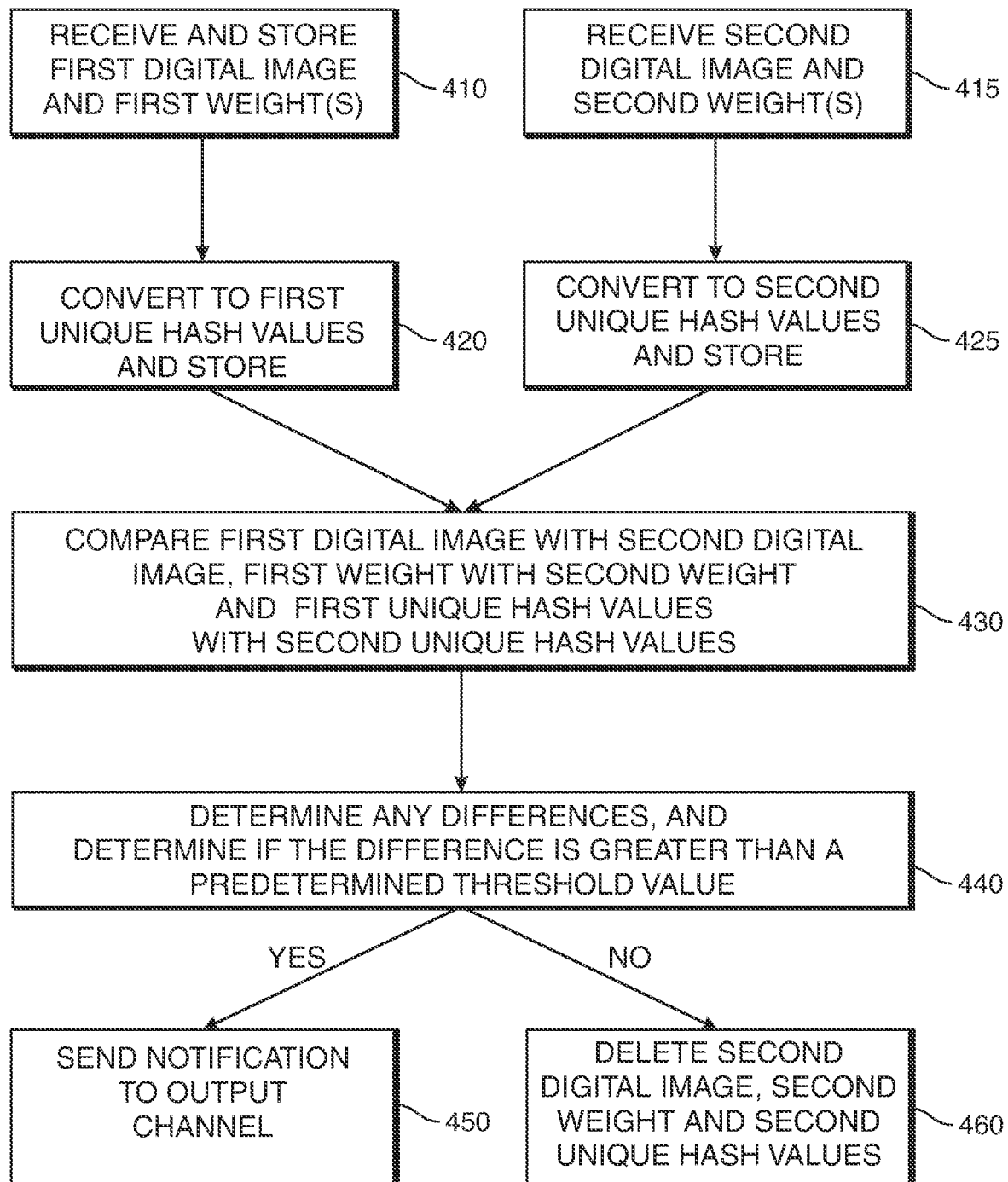
FIG. 4 shows an illustrative method in accordance with the principles of the disclosure.

FIG. 4 shows an illustrative method in accordance with the principles of the disclosure. Methods may include some or all of the method steps 410-460. Methods may include the steps illustrated in FIG. 4 in an order different from the illustrated order. The illustrative method shown in FIG. 4 may include one or more steps performed in FIG. 2 or FIG. 3, or described herein.

At step 410, a computer server (e.g. a media or centralized server, or cloud-based server) may receive and store a first digital image or images and a first weight or weights, of the contents in a safe deposit box. At step 420, the server may then convert the first digital image and first weight to first unique hash values and store the first unique hash values in non-transitory memory.

At step 415, the computer server (e.g. a media or centralized server, or cloud-based server) may receive and store a second digital image or images and a second weight or weights, of the contents in a safe deposit box. At step 425, the server may then convert the second digital image and second weight to second unique hash values and store the second unique hash values in non-transitory memory.

Steps 415 and 425 may occur substantially contemporaneously with steps 410 and 420. Alternatively, steps 415 and 425 may occur at a significantly later time than steps 410 and 420. For example, the first digital image and first weight may be received by the server at time zero. The first digital image and first weight, along with the first unique hash values may comprise the initial, baseline readings. In alternative embodiments, the second digital image and second weight(s) may be received by the server at time zero plus, for example, 1 day, 1 week, 1 month, or 1 year. These times may be determined by the user, the financial institution or through an algorithm.

At step 430, the computer server may compare the first digital image with the second digital image, the first weight with the second weight, and the first unique hash values with the second unique hash values. These comparisons may be made through any suitable algorithm.

At step 440, the computer server may determine if there is any difference between the first digital image with the second digital image, the first weight with the second weight, and the first unique hash values with the second unique hash values. If there is a difference, the computer server may determine if the difference is greater than a pre-determined threshold value. For example, the threshold value may be 5%. In an embodiment, this pre-determined threshold value may be changed by the customer or financial institution.

If any difference is greater than the pre-determined threshold value, the computer server may send a notification of the difference to an output channel, at step 450. Appropriate output channels may include, inter alia, a mobile phone browser, a mobile phone app, an internet browser, or an ATM.

If there is no difference or any difference is smaller than the pre-determined threshold value, the computer server may then delete second digital image(s), second weight(s), and second unique hash values at step 460. The first digital image(s), first weight(s), and first unique hash values may remain in the non-transitory memory to become initial/baseline readings that later digital images, weights, and hash values may be compared against.

Figure 5:
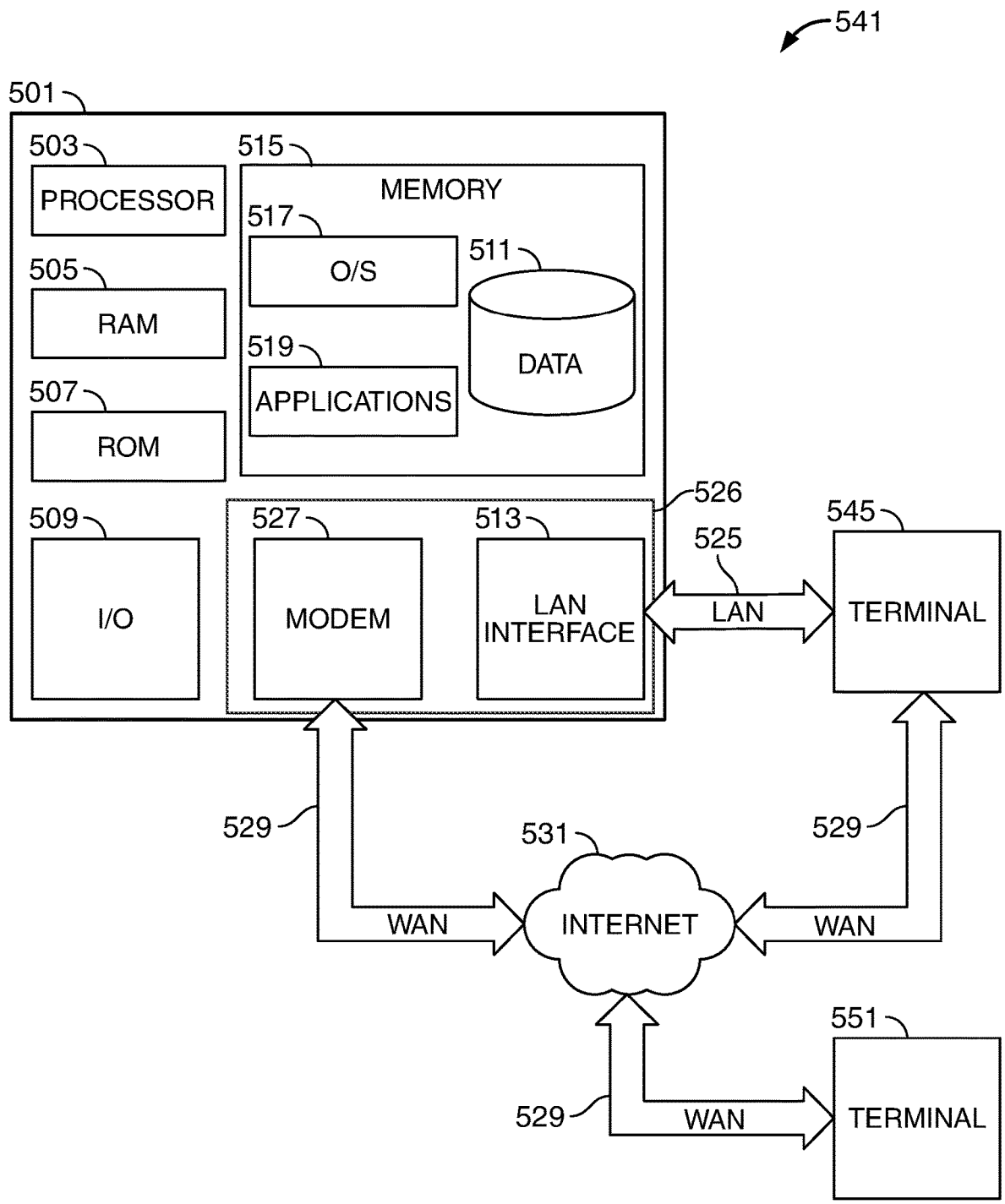
FIG. 5 shows an illustrative system in accordance with the principles of the disclosure.

FIG. 5 shows an illustrative block diagram of system 541 that includes a safe deposit box control circuit 501. Control circuit 501 may alternatively be referred to herein as a "computing device." Elements of system 541, including control circuit 501, may be used to implement various aspects of the systems and methods disclosed herein. A "user" of system 541 or control circuit 501 may include other computer systems or servers, such as a centralized server, a media server, and an authentication server.

Control circuit 501 may have a microprocessor 503 for controlling the operation of the device and its associated components, and may include RAM 505, ROM 507, input/output module 509, and a memory 515. The microprocessor 503 may also execute all software running on the control circuit 501—e.g., the operating system. Other components commonly used for computers, such as EEPROM or Flash memory or any other suitable components, may also be part of the control circuit 501.

The memory 515 may be comprised of any suitable permanent storage technology—e.g., a hard drive or other non-transitory memory. The ROM 507 and RAM 505 may be included as all or part of memory 515. The memory 515 may store software including the operating system 517 and application(s) 519 along with any other data 511 needed for the operation of the system 541. Memory 515 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The microprocessor 503 may execute the instructions embodied by the software and code to perform various functions.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

In an embodiment of the control circuit 501, the microprocessor 503 may execute the instructions in all or some of the operating system 517, any applications 519 in the memory 515, and any other code embodied in hardware or firmware (not shown).

An input/output ("I/O") module 509 may include connectivity to a camera, weight sensor, or network interface through which higher hierarchal server or a user of control circuit 541 may provide input. The input may include input relating to cursor movement. The input/output module 509 may also include one or more speakers for providing audio output and a video display device, such as an LED screen and/or touchscreen, for providing textual, audio, audiovisual, and/or graphical output (not shown). The input and output may be related to results from a camera and weight sensor(s).

System 541 may be connected to other systems, computers, servers, and/or the internet via a local area network (LAN) interface 513.

System 541 may operate in a networked environment supporting connections to one or more remote computers and servers, such as terminals 545 and 551, including, in general, the internet and "cloud". References to the "cloud" in this disclosure generally refer to the internet. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 545 and 551 may be personal computers or servers that include many or all of the elements described above relative to system 541. The network connections depicted in FIG. 5 include a local area network (LAN) 525 and a wide area network (WAN) 529 but may also include other networks. Control circuit 501 may include a NIC 526, which may include a modem 527 and LAN interface or adapter 513, as well as other components and adapters (not shown). When used in a LAN networking environment, control circuit 501 is connected to LAN 525 through a LAN interface or adapter 513. When used in a WAN networking environment, control circuit 501 may include a modem 527 or other means for establishing communications over WAN 529, such as Internet 531. The modem 527 and/or LAN interface 513 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Application program(s) 519 (which may be alternatively referred to herein as "plugins," "applications," or "apps") may include computer executable instructions for invoking user functionality related performing various tasks. In an embodiment, application program(s) 119 may be cloud-based applications. The various tasks may be related to taking and storing photographs, videos, and weights of contents of a safe deposit box.

Control circuit 501 may also include various other components, such as a battery (not shown), speaker (not shown), NIC 526, and/or antennas (not shown).

Terminal 551 and/or terminal 545 may be portable devices such as a laptop, cell phone, Blackberry™, tablet, smartphone, or any other suitable device for receiving, storing, transmitting and/or displaying relevant information. Terminals 551 and/or terminal 545 may be other devices such as remote servers.

Any information described above in connection with data 511, and any other suitable information, may be stored in memory 515. One or more of applications 519 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 6:
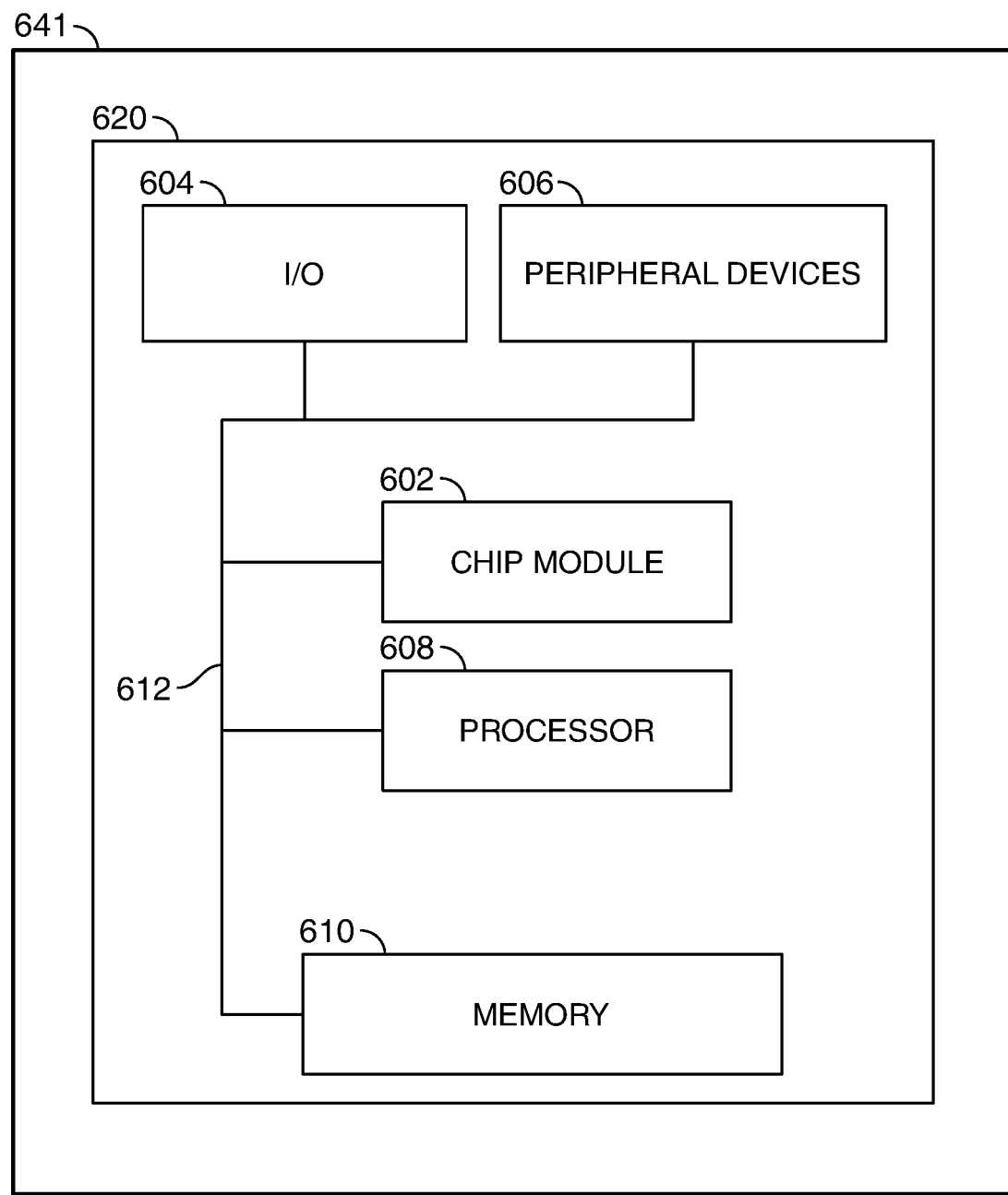
FIG. 6 shows an illustrative system in accordance with the principles of the disclosure.

FIG. 6 shows illustrative apparatus 641 that may be configured in accordance with the principles of the disclosure. Apparatus 641 may be a safe deposit box control circuit. Apparatus 641 may include one or more features of the apparatus shown in FIGS. 1 and 5. Apparatus 641 may include chip module 602, which may include one or more integrated circuits, and which may include logic configured to perform any other suitable logical operations.

Apparatus 641 may include one or more of the following components: I/O circuitry 604, which may include a transmitter device and a receiver device and may interface with fiber optic cable, coaxial cable, telephone lines, wireless devices, PHY layer hardware, a keypad/display control device, an LED screen, a touchscreen or any other suitable media or devices; peripheral devices 606, which may include batteries and chargers, counter timers, real-time timers, power-on reset generators or any other suitable peripheral devices; logical processing device 608, which may compute data structural information and structural parameters of the data; and machine-readable memory 610.

Machine-readable memory 610 may be configured to store in machine-readable data structures: machine executable instructions (which may be alternatively referred to herein as "computer instructions" or "computer code"), applications, signals, recorded data, and/or any other suitable information or data structures.

Components 602, 604, 606, 608 and 610 may be coupled together by a system bus or other interconnections 612 and may be present on one or more circuit boards such as 620. In some embodiments, the components may be integrated into a single chip. The chip may be silicon-based.

Thus, apparatus and methods for remotely viewing and authenticating the contents of a safe deposit box have been provided. Persons skilled in the art will appreciate that the present invention can be practiced by other than the described embodiments, which are presented for purposes of illustration rather than of limitation.

What is claimed is:

1. A method for remotely validating contents of a safe deposit box, said method comprising:
   sending, from a media server, a first time-stamped digital image, a first time-stamped weight, a second time-stamped digital image, and a second time-stamped weight to a centralized server, wherein the first time-stamped digital image and the first time-stamped weight were taken at a first time, and the second time-stamped digital image and the second time-stamped weight were taken at a second time, by at least one camera and at least one weight sensor inside the safe deposit box;
   storing the first time-stamped digital image, first time-stamped weight, second time-stamped digital image, and second time-stamped weight on the centralized server;
   converting, at the centralized server, the first time-stamped digital image and the first time-stamped weight to first unique hash values, and the second time-stamped digital image and second time-stamped weight to second unique hash values;
   storing the first unique hash values and second unique hash values at the centralized server;
   comparing, at the centralized server, the first time-stamped digital image with the second time-stamped digital image, the first time-stamped weight with the second time-stamped weight, and the first unique hash values to the second unique hash values; and
   generating, at the centralized server, a list of the comparisons.

2. The method of claim 1, further comprising:
   determining, at the centralized server, if there is a difference between the first unique hash values and second unique hash values greater than a predetermined threshold value.

3. The method of claim 2 wherein the predetermined threshold value is 1%.

4. The method of claim 2 further comprising:
   sending, if the determined difference is greater than the predetermined threshold value, from the centralized server, a notification of the difference to an output channel selected by the centralized server through one or more machine learning algorithms.

5. The method of claim 1, further comprising:
   sending, from the centralized server, the list of the comparisons to an output channel selected by the centralized server through one or more machine learning algorithms.

6. The method of claim 5 wherein the output channel is a mobile device.

7. The method of claim 1, further comprising:
   generating a combined image of the first time-stamped digital image and the second time-stamped digital image wherein the first time-stamped digital image and the second time-stamped digital image are located next to each other and are each one-half of the combined image; and
   sending the combined image to an output channel selected by the centralized server through one or more machine learning algorithms.

* * * * *